United States Patent
Sachinkumar et al.

(10) Patent No.: US 12,373,431 B2
(45) Date of Patent: Jul. 29, 2025

(54) QUERY OPTIMIZATION FOR PLANNER STATISTICS FOR DATABASES

(71) Applicant: INTERNATIONAL BUSINESS MACHINES CORPORATION, Armonk, NY (US)

(72) Inventors: Jain Sachinkumar, Shrewsbury, MA (US); Kapish Kumar, Bangalore (IN); Gaurav Mehrotra, Pune (IN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 18/491,087

(22) Filed: Oct. 20, 2023

(65) Prior Publication Data

US 2025/0130998 A1    Apr. 24, 2025

(51) Int. Cl.
    *G06F 16/00*      (2019.01)
    *G06F 16/2453*    (2019.01)
    *G06F 16/2458*    (2019.01)

(52) U.S. Cl.
    CPC .... *G06F 16/24545* (2019.01); *G06F 16/2462* (2019.01)

(58) Field of Classification Search
    CPC .......... G06F 16/24545; G06F 16/2462
    See application file for complete search history.

(56) References Cited

U.S. PATENT DOCUMENTS

| | | | |
|---|---|---|---|
| 7,917,502 B2 | 3/2011 | Cheng et al. | |
| 9,798,772 B2* | 10/2017 | Wu | G06F 16/532 |
| 10,970,295 B2* | 4/2021 | Burger | G06F 16/2465 |
| 2009/0018992 A1* | 1/2009 | Zuzarte | G06F 16/24524 |
| 2009/0216709 A1* | 8/2009 | Cheng | G06F 16/2453 |
| 2016/0162599 A1* | 6/2016 | Dickie | G06F 16/9017 707/769 |
| 2020/0073986 A1* | 3/2020 | Purcell | G06F 16/21 |
| 2020/0285642 A1* | 9/2020 | Bei | G06N 5/01 |
| 2021/0034616 A1* | 2/2021 | Kiebler | G06F 16/2453 |
| 2021/0056106 A1* | 2/2021 | Au | G06F 16/284 |

(Continued)

OTHER PUBLICATIONS

El-Helw et al., "Collecting and Maintaining Just-in-Time Statistics", IEEE, 2007, pp. 516-525 (Year: 2007).*

(Continued)

*Primary Examiner* — Alexander Khong
(74) *Attorney, Agent, or Firm* — Teddi Maranzano, Esq.; Rachel L. Pearlman, Esq.; Heslin Rothenberg Farley & Mesiti P.C.

(57) ABSTRACT

Computer implemented methods, systems, and computer program products include program code executing on a processor(s) that obtains a user query. The program code selects just in time (JIT) statistics relevant for use by a cost optimizer to generate a plan file for executing the user query by determining, based on JIT metadata in a JIT statistics cache, if JIT statistics generated responsive to an earlier event are these JIT statistics, and based on determining that the JIT statistics generated responsive to the earlier event are these JIT statistics, selects these JIT statistics to generate the plan file. The program code utilizes the cost optimizer to generate the plan file based on these JIT statistics. The program code executes the user query in the target database based on the plan file.

18 Claims, 5 Drawing Sheets

(56) References Cited

U.S. PATENT DOCUMENTS

2023/0169077 A1* 6/2023 Zhang ................ G06F 11/3419
707/718

OTHER PUBLICATIONS

"Collecting and Maintaining Just-in-Time Statistics" Amr El-Helw, et al. Conference Paper 2007. 11 pages.
"Just In Time Indexing" Pinaki Mitra, et al. NETs 2012 International Conference on Internet Studies, Aug. 17-19, 2012. 13 pages.
"Predicting Query Execution Time for JIT Compiled Database Engines" Kostas Chasialis, et al. 13th Annual Conference on Innovative Data Systems Research (CIDR '23). Jan. 8-11, 2023. 1 pg.

* cited by examiner

| TIMESTAMP | TABLE NAME | OBJECT ID | JIT-QUERY | COUNT |
|---|---|---|---|---|
| 2022-01-26 06:22:02 | TPCH3000.ADMIN.ORDERS | 985012 | TPCH3000.ADMIN.ORDERS ((ORDERS.O_ORDERDATE= '1993-10-01'::DATE)) Cardinality ORDERS.O_CUSTKEY Cardinality ORDERS.O_CUSTKEY | 171.7M 170.8M 169.9M |
|  |  |  |  |  |
|  |  |  |  |  |
| 2022-01-26 06:22:02 | TPCH3000.ADMIN.LINEITEM | 985046 | LINEITEM ((LINEITEM.L_RETURNFLAG= 'R'::DPCHAR)) Cardinality LINEITEM.L_ORDERKEY | 4.4B 1.8B |
|  |  |  |  |  |

FIG. 3

QUERY OPTIMIZATION FOR PLANNER STATISTICS FOR DATABASES

BACKGROUND

The present invention relates generally to the field of query optimization in databases and, specifically, efficient query planning and execution.

Various computing systems utilize Just in Time (JIT) statistics on user tables to help an optimizer refine (e.g., query) planning. Generally, JIT statistics are not run on system tables, external tables, or virtual tables. JIT statistics are utilized to improve selectivity estimations when a table contains data skew or when there are complex column/join restrictions. Based on available statistics, computing systems can also use JIT statistics to avoid broadcasting large tables that were estimated to be small. Query performance can be improved by using JIT statistics because the overhead of these statistics is negligible when compared to the overall improved query performance and total query time. JIT statistics are generated by querying actual data to determine estimates for query execution planning. In this way, program code (running automatically) generates JIT statistics on user tables to help a query optimizer refine planning.

Artificial intelligence (AI) refers to intelligence exhibited by machines. Artificial intelligence (AI) research includes search and mathematical optimization, neural networks, and probability. Artificial intelligence (AI) solutions involve features derived from research in a variety of different science and technology disciplines ranging from computer science, mathematics, psychology, linguistics, statistics, and neuroscience. Machine learning has been described as the field of study that gives computers the ability to learn without being explicitly programmed.

SUMMARY

Shortcomings of the prior art are overcome, and additional advantages are provided through the provision of a computer-implemented method for planning and executing queries in a target database. The method can include: obtaining, by one or more processors, a user query; selecting, by the one or more processors, just in time (JIT) statistics relevant for use by a cost optimizer to generate a plan file for executing the user query, wherein the selecting comprises: determining, by the one or more processors, based on JIT metadata in a JIT statistics cache, if JIT statistics generated responsive to an earlier event are the JIT statistics relevant for use by the cost optimizer to generate the plan file for executing the user query; and based on determining that the JIT statistics generated responsive to the earlier event are the JIT statistics relevant for use by the cost optimizer to generate the plan file for executing the user query, selecting the JIT statistics generated responsive to the earlier event as the JIT statistics relevant for use by the cost optimizer to generate the plan file for executing the user query; utilizing, by the one or more processors, the cost optimizer to generate the plan file, wherein the plan file is based on the JIT statistics relevant for use by the cost optimizer to generate the plan file for executing the user query; and executing, by the one or more processors, the user query in the target database based on the plan file.

Shortcomings of the prior art are overcome, and additional advantages are provided through the provision of a computer program product for planning and executing queries in a target database. The computer program product comprises a storage medium readable by a one or more processors and storing instructions for execution by the one or more processors for performing a method. The method includes, for instance: obtaining, by the one or more processors, a user query; selecting, by the one or more processors, just in time (JIT) statistics relevant for use by a cost optimizer to generate a plan file for executing the user query, wherein the selecting comprises: determining, by the one or more processors, based on JIT metadata in a JIT statistics cache, if JIT statistics generated responsive to an earlier event are the JIT statistics relevant for use by the cost optimizer to generate the plan file for executing the user query; and based on determining that the JIT statistics generated responsive to the earlier event are the JIT statistics relevant for use by the cost optimizer to generate the plan file for executing the user query, selecting the JIT statistics generated responsive to the earlier event as the JIT statistics relevant for use by the cost optimizer to generate the plan file for executing the user query; utilizing, by the one or more processors, the cost optimizer to generate the plan file, wherein the plan file is based on the JIT statistics relevant for use by the cost optimizer to generate the plan file for executing the user query; and executing, by the one or more processors, the user query in the target database based on the plan file.

Shortcomings of the prior art are overcome, and additional advantages are provided through the provision of a system for planning and executing queries in a target database. The system includes: a memory, one or more processors in communication with the memory, and program instructions executable by the one or more processors via the memory to perform a method. The method includes, for instance: obtaining, by the one or more processors, a user query; selecting, by the one or more processors, just in time (JIT) statistics relevant for use by a cost optimizer to generate a plan file for executing the user query, wherein the selecting comprises: determining, by the one or more processors, based on JIT metadata in a JIT statistics cache, if JIT statistics generated responsive to an earlier event are the JIT statistics relevant for use by the cost optimizer to generate the plan file for executing the user query; and based on determining that the JIT statistics generated responsive to the earlier event are the JIT statistics relevant for use by the cost optimizer to generate the plan file for executing the user query, selecting the JIT statistics generated responsive to the earlier event as the JIT statistics relevant for use by the cost optimizer to generate the plan file for executing the user query; utilizing, by the one or more processors, the cost optimizer to generate the plan file, wherein the plan file is based on the JIT statistics relevant for use by the cost optimizer to generate the plan file for executing the user query; and executing, by the one or more processors, the user query in the target database based on the plan file.

Computer systems and computer program products relating to one or more aspects are also described and may be claimed herein. Further, services relating to one or more aspects are also described and may be claimed herein.

Additional aspects of the present disclosure are directed to systems and computer program products configured to perform the methods described above. Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 3 is a representation of a JIT statistics cache generated and referenced by program code (executing on one or more processors) in some embodiments of the present disclosure;

DETAILED DESCRIPTION

Figure 1:
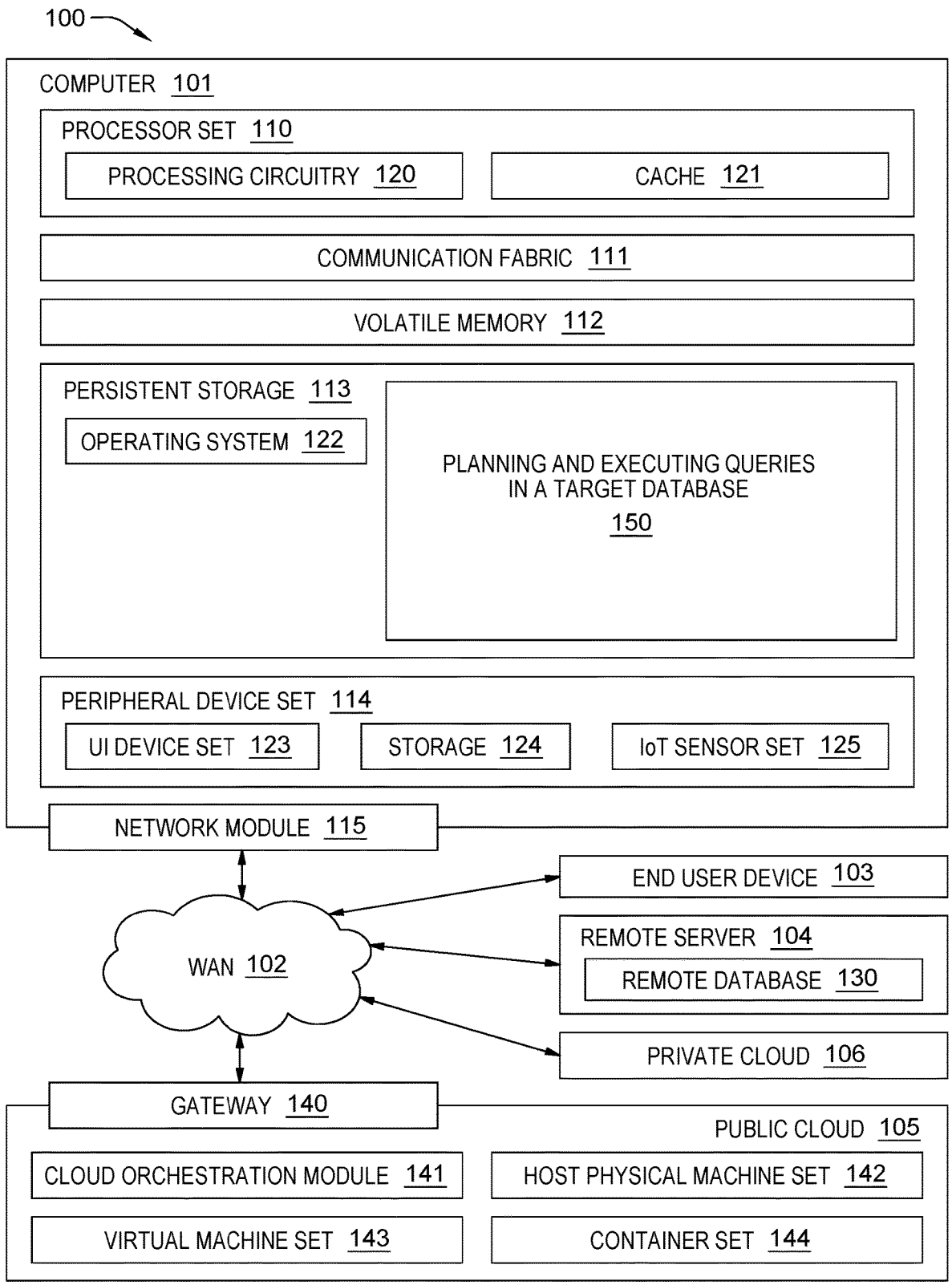
FIG. 1 depicts one example of a computing environment to perform, include and/or use one or more aspects of the present disclosure.

Various computing system utilize Just in Time (JIT) statistics on user tables to help an optimizer refine (e.g., query) planning. As noted earlier, query performance can be improved by using JIT statistics because the overhead of these statistics is negligible when compared to the overall improved query performance and total query time. Program code executing on one or more processors can utilize JIT statistics, a sampler scan functionality, and zone map information to conditionally various data, including: the number of rows that are scanned for the target table, the number of extents that are scanned for the target table, the number of maximum extents that are scanned for the target table on the data slices with the greatest skew, the number of rows that are scanned for the target table that apply to each join, and/or the number of unique values for any target table column that is used in subsequent join or group by processing. Program code in database systems is generally configured to automatically runs JIT statistics for user tables when it detects the following conditions: tables that contain more than 5,000,000 records, queries that contain at least one column restriction, and/or tables that participate in a join or have an associated materialized view. In some database systems, JIT statistics are integrated with materialized views to ensure that the exact number of extents is scanned.

JIT statistics are often automatically generated and utilized in enterprise data systems, such as enterprise data warehouses, because enterprise data warehouses can utilize cost-based optimizers to generate query execution plans for user queries. This optimizer benefits (in accuracy and efficiency) by utilizing statistics, including JIT statistics to generate query plans. However, some performance drawbacks exist based on the continuous and automatic execution of processes that collect and update JIT statistics. Because JIT statistics are generated by program code automatically, each time a query is executed, collecting (anew) JIT statistics, generating these JIT statistics can take time and resources from user query execution. JIT statistic queries (queries executed automatically by the program code that generate JIT statistics) behaves like user queries and are available in a workload manager output as a SQB (Short Query). Hence, JIT statistic queries have greater priority in an enterprise data system than long running queries. JIT statistic queries can also be referred to as scans. JIT statistic query numbers are dependent on actual number of user queries; the more user queries executed on a given system, the more JIT statistic queries executed (because the first triggers the second). Efficiencies of system can be compromised (time, resources, etc.) when number of user queries are large because if the number of user query inflow is huge, then number of JIT statistic query inflow will also be huge. System impacts of these large query demands include, but are not limited to, delays to user queries. Enterprise data warehouses are examples of database systems in which a multitude of user queries could potentially be executed within a limited time window.

Examples described herein benefit from the query-planning advantages provided by JIT statistics while limiting any negative (e.g., latency) impacts JIT statistic queries can have on user query execution. To that end, the computer-implemented methods, computer program products, and computing systems described herein comprise program code executing on one or more processors that serves as a mechanism to cache JIT statistics (results of JIT statistic queries) for similar tables. The program code in some examples herein can generate and retain one or more caches that contain JIT statistic queries (which was executed), and the results of the JIT statistic queries. Thus, when the program code determines that a similar JIT statistic query was submitted, the program determines whether to return query results from the cache or whether to execute the query to update the statistics (e.g., the regular processing for the JIT statistic query). In some examples, if the program code determines that there is hit in the cache, the program code returns results from the cache. If the program code determines that the is no cache hit, the program code will enable execution of the query as regular mechanism. By utilizing results caching for JIT statistic queries, as described herein, the examples herein the number of JIT statistic queries that hit the system (e.g., database including enterprise database systems such as enterprise data warehouses) can be reduced and execution of the actual (user, application, etc.) queries will be executed more efficiently because more resources will be available to execute these queries and thus, query execution performance can be improved.

Embodiments of the present invention are inextricably tied to computing. The examples herein provide a computer-based solution to an issue in computing. Query optimizers enable the planning and more efficient execution of queries, however, to derive the JIT statistics which aide the query optimizer, certain computing resources which would be utilized to execute user queries are necessarily utilized instead (or at least partially) by JIT statistic queries, which are generating the JIT statistics. Thus, although the query optimizer can plan and execute a user query efficiently, producing the JIT statistics that enable the optimizer to generate this efficient execution plan can slow the queries because system resources are utilized to produce JIT statistics (e.g., executing a JIT statistic query) whenever a user query is submitted. This issue, which is addressed by the examples herein, is routed in computing and the solution presented is similarly inextricably tied to computing: caching, storing, and/or re-using JIT statistics in accordance with the examples herein. The examples herein improve the functionality of the computing system into which they are integrated by improving query efficiency by enabling query planning (optimization) with greater resource usage efficiencies.

The examples herein are directed to a practical application and provide significantly more than existing approaches to query optimization. The examples are directed to a practical application at least because in the examples herein, the speed at which computing systems can execute queries and return query results is increased. In a non-limiting example, if a system user runs over 100,000 user queries every day and each query triggers one JIT statistics query, the system executes, in addition to the over 100,000 user queries, over 100,000 JIT statistics queries (or scans). Each JIT statistics query utilizes the resource of the system, including query execution slots and resources (e.g., CPU, Memory, IO) to get results. By utilizing cached JIT statistics instead of generating them anew (with queries) one could potentially save at least 90% JIT statistics execution queries, which will save system resources. The examples provide significantly more because the drawbacks of using a query optimizer are experienced while the drawback of resource utilization to gather the statistics utilizes by the optimizer negatively impact actual query execution speed are addressed. Thus, based on the examples herein, one can execute optimized user queries within databases while efficiently utilizing the resources of the system and hence, experiencing improved performance.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

One example of a computing environment to perform, incorporate and/or use one or more aspects of the present disclosure is described with reference to FIG. 1. In one example, a computing environment 100 contains an example of an environment for the execution of at least some of the computer code involved in performing the inventive methods, such as a code block for planning and executing queries in a target database 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction path that allow the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation and/or review to an end user, this recommendation would typically be communicated from network module 115 of computer 101 through WAN 102 to EUD 103. In this way, EUD 103 can display, or otherwise present, the recommendation and/or review to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation and/or review based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
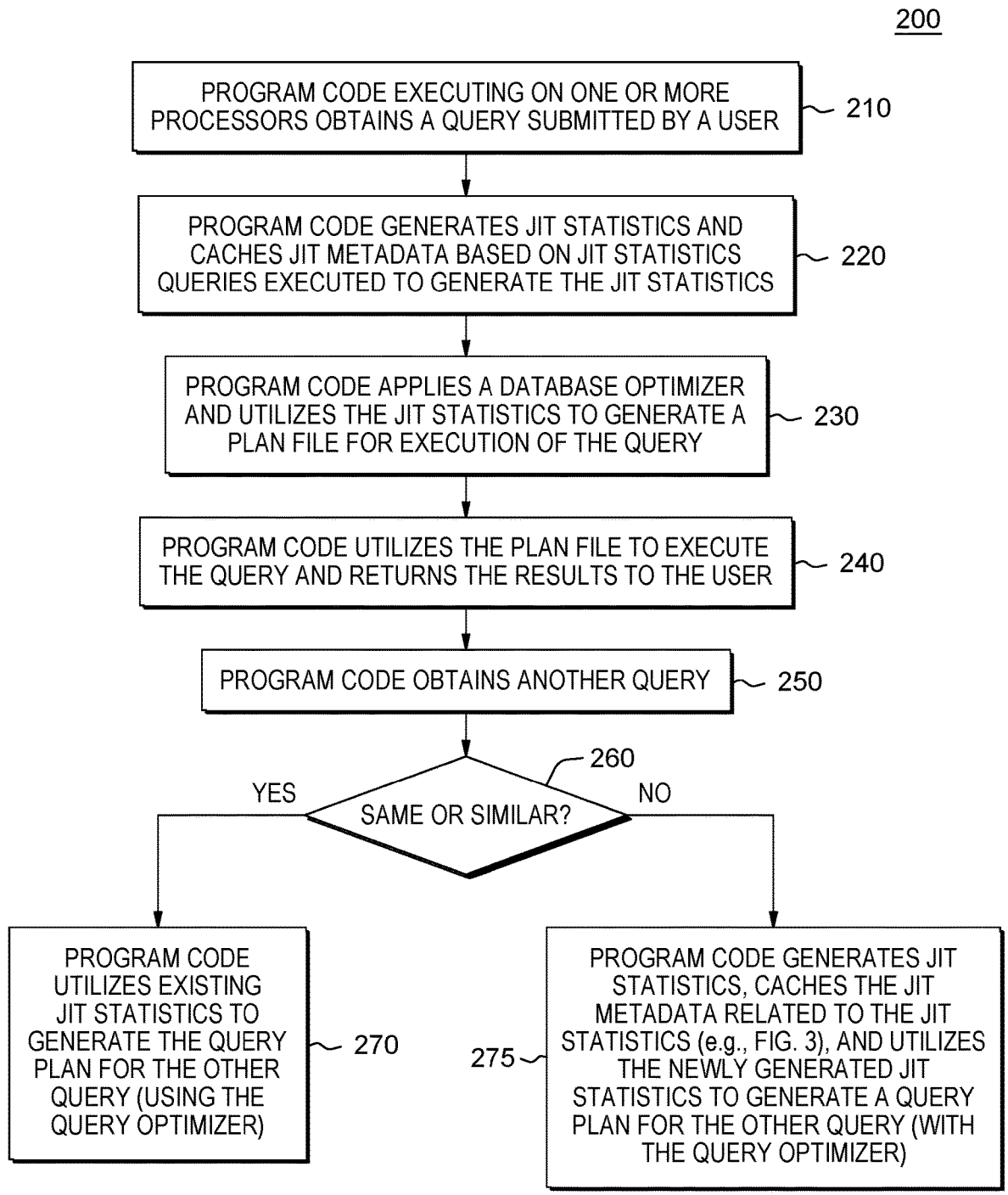
FIG. 2 is a workflow that provides an overview of various aspects performed by the program code (executing on one or more processors) in some embodiments of the present disclosure.

FIG. 2 is a workflow 200 that illustrates various aspects of some examples herein. Additional details for certain of these aspects will be provided in later descriptions and figures. FIG. 2 illustrates a method where program code executing on one or more processors caches and re-uses JIT statistics (results) and these statistics (which can be newly generated of previously cached by the program code) are collected by program code of a cost based optimizer before the optimizer is used by the program code to generate a query plan.

In FIG. 2, program code executing on one or more processors obtains a query submitted by a user (210). The user query can be submitted by a client, user, application, etc. The program code generates JIT statistics and caches the JIT metadata based on the JIT statistics queries executed to generate the JIT statistics (220). FIG. 3 is an example of a JIT statistics cache 300 the program code can generate to cache the JIT metadata. As illustrated in FIG. 3, the JIT metadata in the cache 300 includes a timestamp (for when a JIT statistics query was executed), table names (tables scanned in the query and for which the statistics were generated), an identifier for the query, the JIT statistics query that was executed (which includes, e.g., tables involved, restrictions (e.g., date, flag value, etc.), cardinality (number of elements in a set or other grouping, as a property of that grouping) etc.), and a count of results returned. The cache 300 is a non-limited but specific example of JIT metadata that program code in the examples herein generates based on a specific query, which is provided below. The JIT statistics cache 300 includes metadata related to two JIT statistics queries, both of which are the result of an example query provided below.

```
select
    c_custkey,
    c_name,
    sum(l_extendedprice * (1 - l_discount)) as revenue,
    c_acctbal,
    n_name,
    c_address,
    c_phone,
    c_comment
from
    customer,
    orders,
    lineitem,
    nation
where
    c_custkey = o_custkey
    and l_orderkey = o_orderkey
    and o_orderdate = date '1993-10-01'
    and l_returnflag = 'R'
    and c_nationkey = n_nationkey
group by
    c_custkey,
    c_name,
    c_acctbal,
    c_phone,
    n_name,
    c_address,
    c_comment
order by
    revenue desc
limit 20;
```

This user query selects a customer identifier, customer name, calculates a sum of value to determine revenue, customer account balance, another name (e.g., name of the country in which an order was placed), address, phone, and comments (from the customer), from the tables customer, orders, line items, and nation. These values are selected under various conditions defined in the where clause, including the order date, whether there was a return, and whether certain values are equal to each other (making sure that the data is consistent are refers to the same entities in a given results line). The query then groups the results by customer identifier, customer name, customer account balance, customer phone, another name (e.g., name of the country in which an order was placed), customer address, and customer comment and orders the results by revenue description, limiting the results to 20 entries.

Returning to FIG. 2, based on obtaining the query above (e.g., 210), program code in executed two JIT statistics queries and generated or updated a cache with JIT metadata (e.g., 220). In this example, the queries were on an order table and on a line item table. To generate JIT statistics, the program code executed two JIT statistic queries or scans.

As illustrated in FIG. 2, the program code applies a database optimizer and utilizes the JIT statistics to generate a plan file for execution of the query (230). The program code utilizes the plan file (which was informed by the JIT statistics) to execute the query and returns the results to the user (240). The program code obtains another query (250). The program code determines if the other query is the same or similar to the (initial) query (260). A similar query is a query where the program code determines that the optimizer can utilize the cached JIT statistics to execute the similar query. For example, the program code can utilize pre-configured business rules to make this determination. The program code can also reference a cache generated by the program code when it executes JIT statistics queries, such as the table in FIG. 3, which provides data about the JIT statistics queries executed. Thus, the program code can reference this table to determine if the other query is the same or similar to the (initial) query. As aforementioned, the JIT statistics cache 300, can include timestamps, table names (tables which were scanned by the JIT statistics queries), and the JIT statistics query itself. Thus, based on comparing the other query (including the tables targeted in the query) to those in the cache, the program code can determine whether previously calculated JIT statistics can be utilized by the optimizer to generate the plan list (execution plan) or if new statistics would be beneficial.

If the program code determines that the query is the same or similar, based on the JIT metadata, the program code utilizes existing JIT statistics to generate the query plan for the other query (using the query optimizer) (270). If the program code determines that the query is not the same or similar, the program code generates JIT statistics, caches the JIT metadata related to the JIT statistics (e.g., FIG. 3), and utilizes the newly generated JIT statistics to generate a query plan for the other query (with the query optimizer) (275).

In some examples, the program code flushes cache results to a meta store system. The program code can flush the results when certain criteria are met, including qualitative and/or quantitative criteria. For example, a given number of changes can be made to a given percentage of the database tables in the technical environment where the program code is executing the queries and/or a given amount of time can have elapsed. By combining generating and flushing a cache, the efficiency of the system and the query speed can be improved.

FIG. 2 is a non-limiting illustration of the examples herein. In some examples, rather than evaluate whether new JIT statistics should be generated (based on executing a scan or query) once the user code had obtained the user query, the program code collects JIT statistic (and can cache these statistics) before a user query is submitted to the database engine. The program code can then determine whether the optimizer could utilize any of the cached statistics when a user query is eventually submitted. The program code could anticipate the types of queries users could submit and trigger JIT scans to generate JIT statistics for these anticipated queries. Thus, when the program code obtains an actual query, the program code can determine whether the actual query matches or is similar to (based on pre-defined criteria) the anticipated or predicted queries. The program code can determine whether to perform a scan for new statistics so the optimizer can generate a query plan or whether the optimizer can utilize the cached statistics. In examples where the program code predicts user queries to generate relevant cache entries of JIT statistics, the program code can apply an AI model to predict a query pattern.

Exampled herein can conserve system resources, As noted earlier, the examples herein provide an opportunity for a query optimizer to utilize existing JIT statistics, that the program code identifies as relevant based on JIT metadata in a JIT statistics cache, rather than automatically generated JIT statistics, which were generated because a scan was triggered by receipt of a user query, to generate a query plan for executing the user query. Skirting JIT statistics scans frees up the resources which would be engaged in this effort to execute other processes, including but not limited to, user queries.

Figure 4:
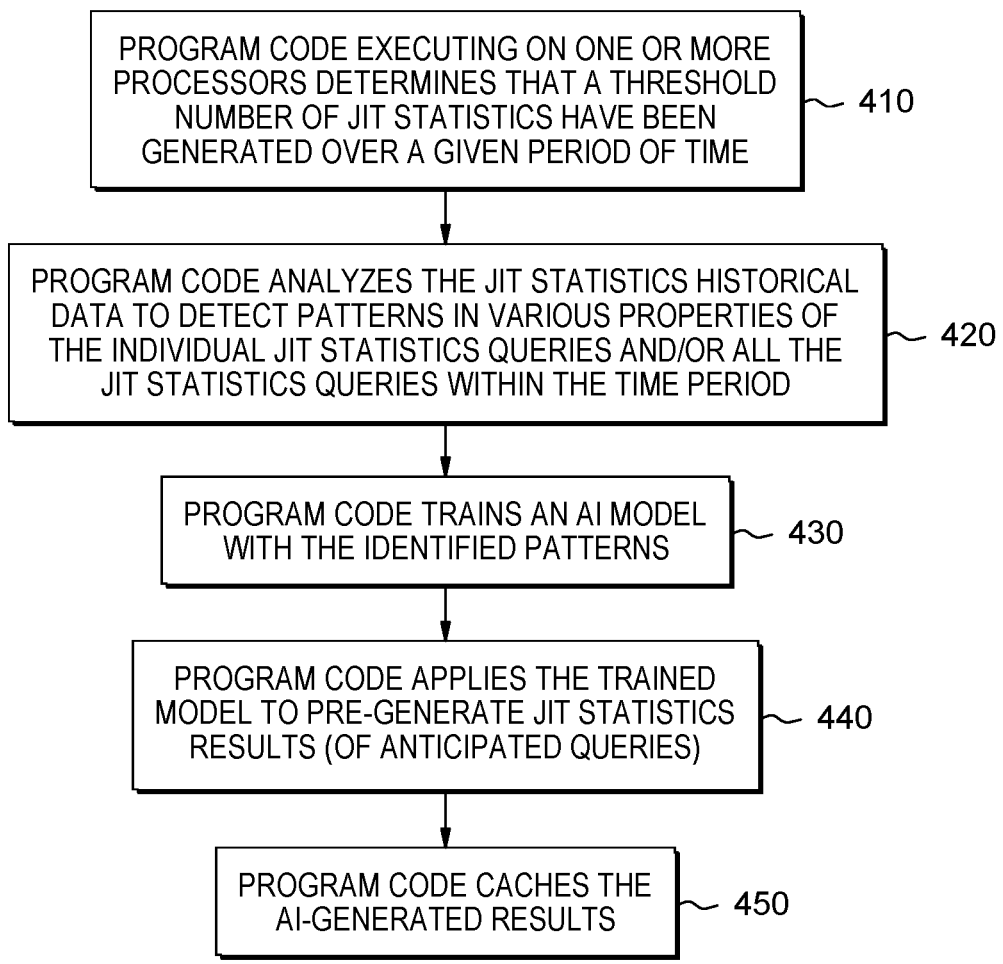
FIG. 4 is a workflow that provides an overview of various aspects performed by the program code (executing on one or more processors) in some embodiments of the present disclosure.

In some examples where the program code predicts user queries to generate relevant cache entries of JIT statistics. The program code can apply an AI model to predict query patterns and generate JIT statistics and update or generate a cache with metadata, so that the program code can determine that the JIT statistics are available either in advance of the program code receiving a user query or at receipt of a query (depending on the configuration of the example). FIG. 4 is a workflow 400 performed by some examples herein that includes the training and utilization of an AI model (which can be understood as a machine learning model) which can be utilized in various examples herein. In this example, program code executing on one or more processors determines that a threshold number of JIT statistics have been generated over a given period of time (e.g., ~30-~60 days) (410). The program code can make this determination, for example, because when JIT statistics are generated, the program code maintains a transactional table with a row for every given time period (e.g., day) in which JIT statistics were generated by the program code. The program code analyzes historical JIT statistics data, which can include the JIT statistics cache (e.g., FIG. 3 300) and/or the transactional table, to detect patterns in various properties of the individual JIT statistics queries and/or all the JIT statistics queries within the time period (420). In various examples, the program code can utilize an existing algorithm to identify these patterns, including a structural algorithm model. In this manner, the program code can train an AI model to predict queries and/or JIT statistics queries, based on the identified patterns, in advance of the program code obtaining these queries. The AI model (a machine learning model) can be trained based on the temporal aspects of the JIT statistics data such that the program code can apply the AI model to predict properties of upcoming queries for a given upcoming period of time (e.g., day). Properties can include, but are not limited to, data volume, and/or cardinality for the given time period. Hence, the program code trains an AI model with the identified patterns (430). The program code applies the trained model to pre-generate JIT statistics results (of anticipated queries) (440). The program code caches the AI-generated results (450). In some examples, the AI model does not predict queries, but rather periodically performs scans to re-learn the machine learning model.

Figure 5:
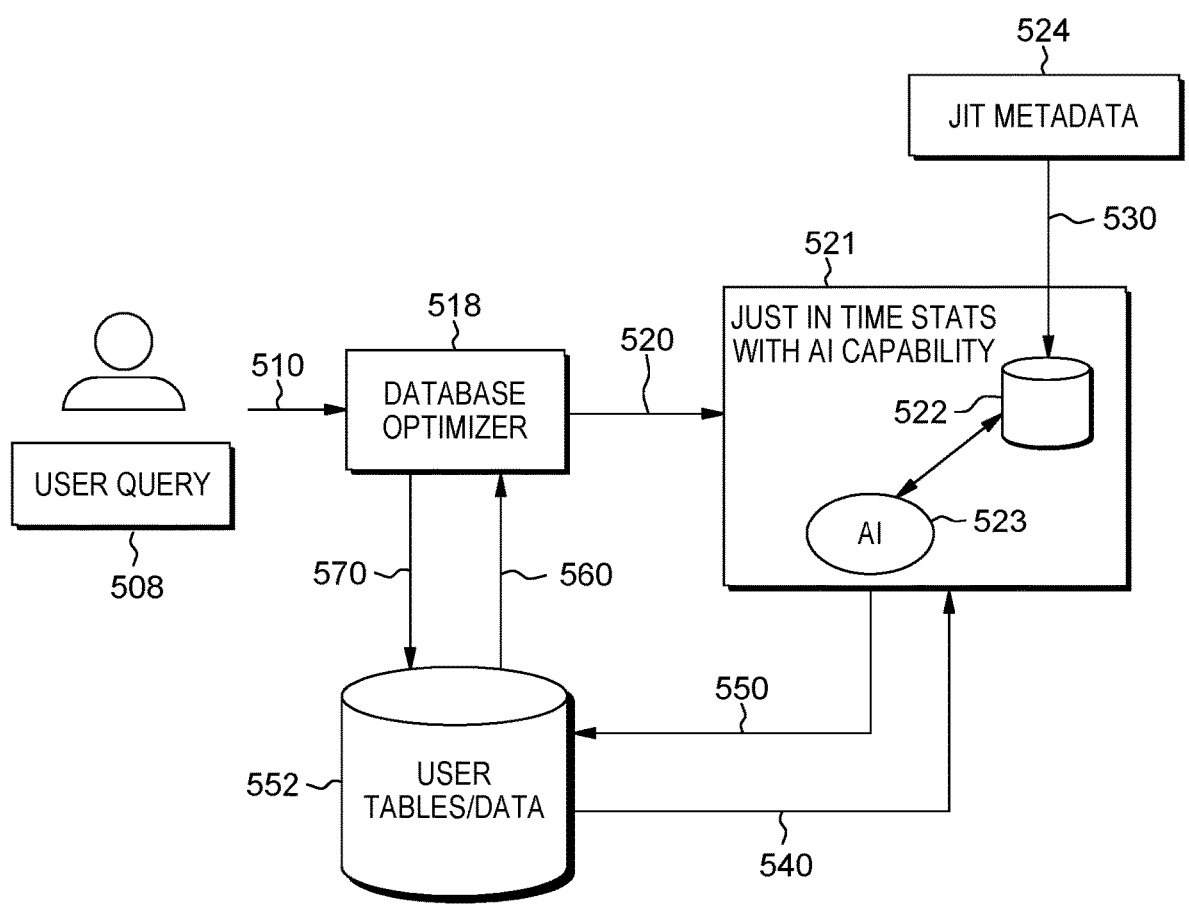
FIG. 5 is a black diagram that illustrates various aspects of a technical environment into which various aspects described herein can be implemented.

FIG. 5 is a block diagram of a technical architecture 500 into which aspects of the examples herein have been implemented. Included in this technical architecture 500 are a data optimizer 518, user tables or data 552, a JIT statistics capability 521, that includes a JIT statistics cache 522, and as AI model 523. This example include the AI aspects discussed in FIG. 4. As illustrated in FIG. 5, program code (of a database optimizer 518) executing on one or more processors obtains a user query 508 (510). The program code accesses a JIT statistics cache 522 to determine, based on the JIT metadata 524 (from previous JIT statistics queries; the program code saved the metadata 524 in the cache 522 (530)) and/or JIT statistics generated by an AI-model 523 (with metadata recorded in the cache 522), if the data optimizer 518 can generate a plan file utilizing existing JIT statistical data (520). The AI model 523 generates JIT statistics, as explained in FIG. 4, based on identifying query patterns in the user tables or data 552, including, in some examples, in a transactional table among the user tables or data 552 (540). If the program code determines that the existing JIT statistics cannot be utilized by the database optimizer 518 to generate a plan file for the user query 508, the program code executes the JIT statistics queries triggered by the user query 508 on the user tables or data 552 to generate JIT statistics (and update the JIT statistics cache 522 with the JIT metadata 524 from these JIT statistics queries) (550). If the program code determines that the existing JIT statistics can be utilized by the database optimizer 518 to generate a plan file for the user query 508, the database optimizer obtains existing JIT statistics (560). The database optimizer generates a plan file and program code executes the user query according to the plan file on the user tables or data 552 (570).

The examples herein include computer-implemented methods, computer program products, and computer systems for planning and executing queries in a target database. The examples can include program code executed by one or more processors that obtains a user query. The program code selects just in time (JIT) statistics relevant for use by a cost optimizer to generate a plan file for executing the user query. The selecting can include the program code determining, based on JIT metadata in a JIT statistics cache, if JIT statistics generated responsive to an earlier event are the JIT statistics relevant for use by the cost optimizer to generate the plan file for executing the user query. Based on the program code determining that the JIT statistics generated responsive to the earlier event are the JIT statistics relevant for use by the cost optimizer to generate the plan file for executing the user query, the program code selects the JIT statistics generated responsive to the earlier event as the JIT statistics relevant for use by the cost optimizer to generate the plan file for executing the user query. The program code utilizes the cost optimizer to generate the plan file; the plan file is based on the JIT statistics relevant for use by the cost optimizer to generate the plan file for executing the user query. The program code executes the user query in the target database based on the plan file.

In some examples, the program code selecting the JIT statistics relevant for use by the cost optimizer to generate the plan file for executing the user query further comprises, based on the program code determining that the JIT statistics generated responsive to the earlier event are not the JIT statistics relevant for use by the cost optimizer to generate the plan file for executing the user query, the program code generates, based on the user query, the JIT statistics relevant for use by a cost optimizer. In this example, the JIT statistics relevant for use by the cost optimizer to generate the plan file for executing the user query are relevant to one or more tables in the target database referenced in the user query and generating the JIT statistics relevant for use by the cost optimizer to generate the plan file for executing the user query comprises the program code executing one or more JIT queries in the target database and obtaining the JIT statistics relevant for use by the cost optimizer to generate the plan file for executing the user query as results and caching metadata of the results in the JIT statistics cache.

In some examples, the program code determining if JIT statistics generated responsive to an earlier event are the JIT statistics relevant for use by the cost optimizer to generate the plan file for executing the user query comprises: the program code comparing aspects of the user query to the JIT metadata to determine if a previously executed user query that for which selecting the JIT statistics relevant for use by the cost optimizer to generate the plan file for executing the user query comprised generating the JIT statistics is similar to the user query.

In some examples, the program code comparing include the program code determining one or more JIT queries triggered by the user query. The program code checks if the JIT metadata comprises the one or more JIT queries triggered by the user query. Based on the JIT metadata comprising the one or more JIT queries triggered by the user query, the previously executed user query is similar to the user query.

In some examples, the earlier event is selected from the group consisting of: execution of one or more JIT queries based one obtaining an earlier user query and generation of JIT statistics by a machine learning model.

In some examples, the earlier event is generation of JIT statistics by a machine learning model and the generation by the machine learning model comprises: the program code determines, based on a transactional table, that a threshold number of JIT statistics have been generated over a given time period, the program code analyzes the JIT statistics cache and transactional table to detect patterns in user queries within the given time period. The program code trains the machine learning model with the detected patterns. The program code applies the machine learning model to predict a set of JIT statistics to be generated at a future time based on anticipated user queries triggering one or more new JIT statistics queries. The program code generates the set of JIT statistics. The program code updates the JIT statistics cache with JIT metadata of the one or more new JIT statistics queries.

In some examples, the program code analyzing comprises the program code applying a machine learning algorithm to learn the patterns.

In some examples, the program code determining comprises the program code comparing aspects of the user query to the JIT metadata to determine if JIT statistics generated by a machine learning model in advance of obtaining the user query were generated based on one or more queries similar to the user query.

In some examples, the program code comparing comprises: the program code determining one or more JIT queries executed by the machine learning model, and the program code checking if the JIT metadata comprises the one or more JIT queries executed by the machine learning model, wherein based on the JIT metadata comprising the one or more JIT queries, the JIT statistics generated by the machine learning model in advance of obtaining the user query were generated based on one or more queries similar to the user query.

In some examples, the JIT metadata comprises values selected from the group consisting of: timestamp, table name, object identifier, JIT statistics query, and count.

Although various embodiments are described above, these are only examples. For example, reference architectures of many disciplines may be considered, as well as other knowledge-based types of code repositories, etc., may be considered. Many variations are possible.

Various aspects and embodiments are described herein. Further, many variations are possible without departing from a spirit of aspects of the present disclosure. It should be noted that, unless otherwise inconsistent, each aspect or feature described and/or claimed herein, and variants thereof, may be combinable with any other aspect or feature.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of planning and executing queries in a target database, the method comprising:
    obtaining, by one or more processors, a user query;
    selecting, by the one or more processors, just in time (JIT) statistics relevant for use by a cost optimizer to generate a plan file for executing the user query, wherein the selecting comprises:
        determining, by the one or more processors, based on JIT metadata in a JIT statistics cache, if JIT statistics generated responsive to an earlier event are the JIT statistics relevant for use by the cost optimizer to generate the plan file for executing the user query; and
        based on determining that the JIT statistics generated responsive to the earlier event are the JIT statistics relevant for use by the cost optimizer to generate the plan file for executing the user query, selecting the JIT statistics generated responsive to the earlier event as the JIT statistics relevant for use by the cost optimizer to generate the plan file for executing the user query;
    utilizing, by the one or more processors, the cost optimizer to generate the plan file, wherein the plan file is based on the JIT statistics relevant for use by the cost optimizer to generate the plan file for executing the user query; and
    executing, by the one or more processors, the user query in the target database based on the plan file, wherein the earlier event is generation of JIT statistics by a machine learning model and the generation by the machine learning model comprises:
        determining, by the one or more processors, based on a transactional table, that a threshold number of JIT statistics have been generated over a given time period;
        analyzing, by the one or more processors, the JIT statistics cache and transactional table, to detect patterns in user queries within the given time period;
        training, by the one or more processors, the machine learning model with the detected patterns;
        applying, by the one or more processors, the machine learning model to predict a set of JIT statistics to be generated at a future time based on anticipated user queries triggering one or more new JIT statistics queries;
        generating, by the one or more processors, the set of JIT statistics; and
        updating, by the one or more processors, the JIT statistics cache with JIT metadata of the one or more new JIT statistics queries.

2. The computer-implemented method of claim 1, wherein selecting the JIT statistics relevant for use by the cost optimizer to generate the plan file for executing the user query further comprises:
    based on determining that the JIT statistics generated responsive to the earlier event are not the JIT statistics relevant for use by the cost optimizer to generate the plan file for executing the user query, generating, by the one or more processors, based on the user query, the JIT statistics relevant for use by a cost optimizer, wherein the JIT statistics relevant for use by the cost optimizer to generate the plan file for executing the user query are relevant to one or more tables in the target database referenced in the user query, wherein generating the JIT statistics relevant for use by the cost optimizer to generate the plan file for executing the user query comprises executing one or more JIT queries in the target database and obtaining the JIT statistics relevant for use by the cost optimizer to generate the plan file for executing the user query as results and caching metadata of the results in the JIT statistics cache.

3. The computer-implemented method of claim 2, wherein the determining if JIT statistics generated responsive to an earlier event are the JIT statistics relevant for use by the cost optimizer to generate the plan file for executing the user query comprises:
    comparing, by the one or more processors, aspects of the user query to the JIT metadata to determine if a previously executed user query that for which selecting the JIT statistics relevant for use by the cost optimizer to generate the plan file for executing the user query comprised generating the JIT statistics is similar to the user query.

4. The computer-implemented method of claim 3, wherein the comparing comprises:
    determining, by the one or more processors, one or more JIT queries triggered by the user query; and
    checking, by the one or more processors, if the JIT metadata comprises the one or more JIT queries triggered by the user query, wherein based on the JIT metadata comprising the one or more JIT queries triggered by the user query, the previously executed user query is similar to the user query.

5. The computer-implemented method of claim 1, wherein the earlier event is selected from the group consisting of: execution of one or more JIT queries based on obtaining an earlier user query and generation of JIT statistics by a machine learning model.

6. The computer-implemented method of claim 1, wherein the analyzing comprises applying a machine learning algorithm to learn the patterns.

7. The computer-implemented method of claim 2, wherein the determining comprises comparing aspects of the user query to the JIT metadata to determine if JIT statistics generated by a machine learning model in advance of obtaining the user query were generated based on one or more queries similar to the user query.

8. The computer-implemented method of claim 7, wherein the comparing comprises:
    determining, by the one or more processors, one or more JIT queries executed by the machine learning model; and
    checking, by the one or more processors, if the JIT metadata comprises the one or more JIT queries executed by the machine learning model, wherein based on the JIT metadata comprising the one or more JIT queries, the JIT statistics generated by the machine learning model in advance of obtaining the user query were generated based on one or more queries similar to the user query.

9. The computer-implemented method of claim 1, wherein the JIT metadata comprises values selected from the group consisting of: timestamp, table name, object identifier, JIT statistics query, and count.

10. A computer system for planning and executing queries in a target database, the computer system comprising:
    a memory; and
    one or more processors in communication with the memory, wherein the computer system is configured to perform a method, said method comprising:
        obtaining, by the one or more processors, a user query;
        selecting, by the one or more processors, just in time (JIT) statistics relevant for use by a cost optimizer to generate a plan file for executing the user query, wherein the selecting comprises:
            determining, by the one or more processors, based on JIT metadata in a JIT statistics cache, if JIT statistics generated responsive to an earlier event are the JIT statistics relevant for use by the cost optimizer to generate the plan file for executing the user query; and
            based on determining that the JIT statistics generated responsive to the earlier event are the JIT statistics relevant for use by the cost optimizer to generate the plan file for executing the user query, selecting the JIT statistics generated responsive to the earlier event as the JIT statistics relevant for use by the cost optimizer to generate the plan file for executing the user query;
        utilizing, by the one or more processors, the cost optimizer to generate the plan file, wherein the plan file is based on the JIT statistics relevant for use by the cost optimizer to generate the plan file for executing the user query; and
        executing, by the one or more processors, the user query in the target database based on the plan file, wherein the earlier event is generation of JIT statistics by a machine learning model and the generation by the machine learning model comprises:
            determining, by the one or more processors, based on a transactional table, that a threshold number of JIT statistics have been generated over a given time period;
            analyzing, by the one or more processors, the JIT statistics cache and transactional table, to detect patterns in user queries within the given time period;
            training, by the one or more processors, the machine learning model with the detected patterns;
            applying, by the one or more processors, the machine learning model to predict a set of JIT statistics to be generated at a future time based on anticipated user queries triggering one or more new JIT statistics queries;
            generating, by the one or more processors, the set of JIT statistics; and
            updating, by the one or more processors, the JIT statistics cache with JIT metadata of the one or more new JIT statistics queries.

11. The computer system of claim 10, wherein selecting the JIT statistics relevant for use by the cost optimizer to generate the plan file for executing the user query further comprises:
    based on determining that the JIT statistics generated responsive to the earlier event are not the JIT statistics relevant for use by the cost optimizer to generate the plan file for executing the user query, generating, by the one or more processors, based on the user query, the JIT statistics relevant for use by a cost optimizer, wherein the JIT statistics relevant for use by the cost optimizer to generate the plan file for executing the user query are relevant to one or more tables in the target database referenced in the user query, wherein generating the JIT statistics relevant for use by the cost optimizer to generate the plan file for executing the user query comprises executing one or more JIT queries in the target database and obtaining the JIT statistics relevant for use by the cost optimizer to generate the plan file for executing the user query as results and caching metadata of the results in the JIT statistics cache.

12. The computer system of claim 11, wherein the determining if JIT statistics generated responsive to an earlier event are the JIT statistics relevant for use by the cost optimizer to generate the plan file for executing the user query comprises:
    comparing, by the one or more processors, aspects of the user query to the JIT metadata to determine if a previously executed user query that for which selecting the JIT statistics relevant for use by the cost optimizer to generate the plan file for executing the user query comprised generating the JIT statistics is similar to the user query.

13. The computer system of claim 12, wherein the comparing comprises:
    determining, by the one or more processors, one or more JIT queries triggered by the user query; and
    checking, by the one or more processors, if the JIT metadata comprises the one or more JIT queries triggered by the user query, wherein based on the JIT metadata comprising the one or more JIT queries triggered by the user query, the previously executed user query is similar to the user query.

14. The computer system of claim 10, wherein the earlier event is selected from the group consisting of: execution of one or more JIT queries based on obtaining an earlier user query and generation of JIT statistics by a machine learning model.

15. The computer system of claim 10, wherein the analyzing comprises applying a machine learning algorithm to learn the patterns.

16. The computer system of claim 11, wherein the determining comprises comparing aspects of the user query to the JIT metadata to determine if JIT statistics generated by a machine learning model in advance of obtaining the user query were generated based on one or more queries similar to the user query.

17. The computer system of claim 16, wherein the comparing comprises:
   determining, by the one or more processors, one or more JIT queries executed by the machine learning model; and
   checking, by the one or more processors, if the JIT metadata comprises the one or more JIT queries executed by the machine learning model, wherein based on the JIT metadata comprising the one or more JIT queries, the JIT statistics generated by the machine learning model in advance of obtaining the user query were generated based on one or more queries similar to the user query.

18. A computer program product for planning and executing queries in a target database, the computer program product comprising:
   one or more computer readable storage media and program instructions collectively stored on the one or more computer readable storage media readable by at least one processing circuit to:
      obtain, by the one or more processors, a user query;
      select, by the one or more processors, just in time (JIT) statistics relevant for use by a cost optimizer to generate a plan file for executing the user query, wherein the selecting comprises:
         determine, by the one or more processors, based on JIT metadata in a JIT statistics cache, if JIT statistics generated responsive to an earlier event are the JIT statistics relevant for use by the cost optimizer to generate the plan file for executing the user query; and
         based on determining that the JIT statistics generated responsive to the earlier event are the JIT statistics relevant for use by the cost optimizer to generate the plan file for executing the user query, select the JIT statistics generated responsive to the earlier event as the JIT statistics relevant for use by the cost optimizer to generate the plan file for executing the user query;
      utilize, by the one or more processors, the cost optimizer to generate the plan file, wherein the plan file is based on the JIT statistics relevant for use by the cost optimizer to generate the plan file for executing the user query; and
      execute, by the one or more processors, the user query in the target database based on the plan file, wherein the earlier event is generation of JIT statistics by a machine learning model and the generation by the machine learning model comprising additional program instructions collectively stored on the one or more computer readable storage media readable by the at least one processing circuit to:
         determine, by the one or more processors, based on a transactional table, that a threshold number of JIT statistics have been generated over a given time period;
         analyze, by the one or more processors, the JIT statistics cache and transactional table, to detect patterns in user queries within the given time period;
         train, by the one or more processors, the machine learning model with the detected patterns;
         apply, by the one or more processors, the machine learning model to predict a set of JIT statistics to be generated at a future time based on anticipated user queries triggering one or more new JIT statistics queries;
         generate, by the one or more processors, the set of JIT statistics; and
         update, by the one or more processors, the JIT statistics cache with JIT metadata of the one or more new JIT statistics queries.

* * * * *